United States Patent [19]

Lowry

[11] Patent Number: 4,670,142
[45] Date of Patent: Jun. 2, 1987

[54] AERATED GRIT TANK

[75] Inventor: John A. Lowry, Columbus, Ohio

[73] Assignee: E & I Corporation, Worthington, Ohio

[21] Appl. No.: 431,785

[22] Filed: Sep. 30, 1982

[51] Int. Cl.$^4$ ............................................. B01D 23/00
[52] U.S. Cl. .................................... 210/207; 210/220; 210/525; 210/526; 210/532.1; 261/77; 261/123
[58] Field of Search ............ 210/160, 197, 207, 512.3, 210/521, 525, 526, 527, 532.1, 533, 788, 220; 261/77, 123

[56] References Cited

U.S. PATENT DOCUMENTS

| | | | |
|---|---|---|---|
| 2,537,904 | 1/1951 | McAllister | 210/220 |
| 2,708,520 | 5/1955 | Dallas | 210/525 |
| 2,826,306 | 3/1958 | Burns | 210/533 X |
| 3,215,276 | 11/1965 | Lind et al. | 210/197 |
| 3,244,280 | 4/1966 | Lind et al. | 210/526 |
| 3,456,798 | 7/1969 | Urdanoff | 210/788 |
| 3,768,657 | 10/1973 | Hoag | 210/526 X |
| 4,123,365 | 10/1978 | Middelbeek | 210/521 |
| 4,192,747 | 3/1980 | Wykoff | 210/525 |
| 4,243,527 | 1/1981 | Leonard | 210/526 X |

Primary Examiner—Richard V. Fisher
Assistant Examiner—W. Gary Jones
Attorney, Agent, or Firm—Robert E. Stebens

[57] ABSTRACT

An aerated grit tank is provided having a longitudinally extending control wall dividing the tank into parallel lift and settling chambers. An air discharge apparatus is provided at the bottom of the lift chamber to induce an upward flow of sewage causing a generally helical flow of sewage around the control wall. The control wall is supported in the tank by mechanisms selectively operable to vertically position the wall with a bottom longitudinally extending edge in predetermined spaced relationship to a bottom floor of the tank whereby the velocity of the cross currents may be effectively controlled. One form of the structure has a single control wall unit while a second form of the invention has two wall forming panels with an uppermost panel supported in fixed relationship to the tank and a lowermost panel supported for vertical displacement.

17 Claims, 7 Drawing Figures

AERATED GRIT TANK

FIELD OF THE INVENTION

This invention relates in general to aerated grit tanks incorporated in sewage treatment plants for effecting an initial separation of inorganic particles, such as sand particles commonly designated as grit, from organic sewage materials that must be subjected to further treatment. It relates more specifically to a grit tank of this type having means enabling selective control of the circulating fluid within the tank, particularly its velocity, for enhanced separation of the grit and its collection with subsequent removal from the tank for better accommodating a wide range of flow rates and concentrations or percentages of the grit, and grit size, with respect to the organic materials that are received for treatment.

BACKGROUND OF THE INVENTION

Raw sewage, as received by sewage treatment plants, invariably includes a certain quantity of hard inorganic particles comprising sand, silt and similar type of materials which are generally termed grit. The sewage treatment plant includes various apparatus components and processes that are intended to operate on and treat the organic components, but their functioning and particularly the operating life of various apparatus components are adversely affected by the presence of the grit which is entrained in the fluids comprising raw sewage. Specifically, apparatus in a sewage treatment plant includes fluid pumps that are used to induce flow of the material through the different processes and these pumps are adversely affected by the existence of the hard inorganic grit particles which cause excessive and rapid wearing of their moving components. Consequently, a first procedural step in most sewage treatments plants must, of necessity, include a grit tank having the primary objective of removing at least the larger size grit particles from the sewage. It is essentially impossible to remove all inorganic materials, but the finer grains that cannot be readily or effectively removed within accepted operating economics have a lesser tendency to affect the treatment process or the operation of the mechanical apparatus such as the pumps. In general, particles that are of a size which will pass through a 65 to 70 mesh screen and have a size not greater than 0.2 mm do not present such a serious problem as to pump and machinery wear that they cannot be accepted for processing with the sewage.

It is the function of a grit tank to initially receive the raw sewage and effect this separation of the undesirably large size grit and enable its removal for separate disposal. This separation is accomplished by providing of a grit tank through which the sewage flows at a predetermined rate relative to the grit size and its quantity such that there will be an opportunity for grit of the unacceptably larger sizes to settle out and deposit on the bottom of the tank where it may be collected for removal. Grit tanks have a generally elongated shape with the sewage flowing in at one end and out at the opposite end. During the course of transport of the sewage through the grit tank, it is desired that a circulatory type of current in the form of a helical path be induced to increase the time period during which the sewage will be retained within the grit tank to better enable the grit to settle out onto the bottom of the tank. The settling of the grit is dependent upon time as it is a gravity type of action. Thus, the longer the period of time that sewage is retained in the grit tank, the greater the opportunity for the grit to settle out of the sewage flowing through the tank. Removal of grit by the simple expedient of effecting a separation by gravity is complicated by the practical fact that sewage is received on a continuing basis at different flow rates with the proportional concentration of sewage and grit also being a continually variable factor. During the course of any selected time period, such as a day, week or longer timeperiod, the raw sewage as it is received will have different proportions or percentages of grit to the other fluids and organic sewage components as well as have variations in the proportionate percentages of different grain sizes for the inorganic grit. Effective separation and collection of grit of greater than acceptable size thus depends in a substantial degree upon the velocity of the circulating currents generated within the grit tank as that is a primary factor determining whether the grit of the selected sizes will be retained for a sufficient time within the tank to permit its settling to the tank floor and subsequent collection. Consequently, it is important to be able to exercise control over the velocity of the circulating currents in order to accommodate the variation in grit size and the quantity of grit that is expected in the raw sewage received by the grit tank.

Attempts have been made to provide such control in order to better enable the separation of the grit. An example of a grit tank designed to achieve the general objectives, is illustrated in U.S. Pat. No. 3,215,276 granted Nov. 2, 1965 to A. C. Lind et al and assigned to Rex Chain Belt, Inc. The grit tank in that patented structure is of an elongated configuration having a generally rectangular cross-section and includes a relatively large chamber disposed in parallel relationship to a relatively small chamber that is located adjacent one longitudinal wall. A helical flow path circulation of the fluid is effected by introducing streams of air into the sewage along a longitudinal line adjacent a bottom wall and within the region of the relatively smaller chamber with that air then functioning as an airlift to cause upward flow of the fluid in the small chamber and thence transversely across the larger chamber. The result is produced, and the sewage must necessarily move through a relatively long path substantially greater than the actual physical longitudinal length of the tank and the sewage is consequentially retained in the tank for a greater length of time. Additionally, the structure disclosed in this patent includes an air distribution system wherein the amout of air that is introduced throughout the longitudinal extent of the tank is of varying quantities with the quantity decreasing successively from a relatively greater amount at the inlet end of the tank to a lesser amount at the outlet end. The effect of this variation in the quantity of air discharged throughout the length of the tank is that the circulatory velocity of the sewage is successively or sequentially decreased as the fluid progresses longitudinally through the tank so that the smaller particles will have a greater tendency to settle at the lower circulatory velocities as they approach the outlet end of the tank. The longitudinal wall or baffle that divides the tank into two chambers is mounted in a manner such that its lower edge is at a fixed elevation with respect to the bottom of the tank and the upper end or longitudinal edge will be a distance below the upper surface of the fluid within the tank.

In a grit tank of the type that is illustrated in U.S. Pat. No. 3,215,276, it is also essential that the circulatory current have a sufficient velocity as to move or displace grit that settles on the bottom of the tank to a collector trough or collection area from which it may be subsequently collected and transported to a discharge point. This circulatory current velocity must be of sufficient magnitude such that it will move grit particles that have settled onto the bottom floor of the tank and to also further aid in separation of any organic particles that may also settle out onto the tank floor along with the grit. The objective is to assure that the organic particles will be separated and again entrained in the fluid for continued transport through the tank and outwardly therefrom for further processing.

SUMMARY OF THE INVENTION

An aerated grit tank is provided by this invention for effecting improved control over the circulatory currents developed in the tank for enhanced separation of grit that may be received in varying sizes and concentrations in the sewage as received during any specific time period. A grit tank embodying this invention includes a longitudinally extending baffle or control wall extending longitudinally of the tank and dividing the tank into two separate chambers that are designated as the settling chamber and lift chamber. An airlift system is provided for generating the circulatory currents with the control of the velocity of such circulation currents being controllable through selective vertical positioning of the control wall or baffle so as to provide adjustability in the spacing of its bottom longitudinal edge with respect to the bottom wall of the tank and to thereby enable adjustment in the area of the space through which the sewage flows during the course of its helical circulation. Increasing or decreasing the relative spacing of the baffle with respect to the bottom wall of the tank will thus result in a proportionate increase or a decrease in the area and in the velocity of the circulating currents and, in particular, an increase or decrease in the the velocity of those current components flowing across and closely adjacent the bottom wall or floor of the tank.

To further enhance the functioning of a grit tank embodying this invention, a grit removal system is provided which embodies a structure which will minimize its interference with the circulatory currents. This grit removal apparatus comprises a drag-out type collector which functions as a continuously moving conveyor having a lower run that is supported in the tank in the form of a catenary. This constructional feature enables the collector to be operational within the grit tank without the need of having other mechanical components such as rotating shafts and sprockets located in the tank itself for maintenance of the conveyor chain in a proper position for collection and movement of the grit from the tank upwardly to a discharge point. A catenary-type of support for the lower run of the conveyor not only has the advantage of minimizing its effect upon the circulation of fluid in the tank, but it eliminates the necessity of mechanical structures within the relatively harsh environment of this type of a tank where they may be subjected to rapid wearing conditions that are occasioned as a consequence of the grit particles themselves as well as the fluids.

A very distinct advantage of the vertically displaceable baffle or control wall in an aerated grit tank of this type is that a more precise control over the velocity of the circulatory currents across the bottom floor of the tank can be readily achieved. Mechanically simple, screw-type support and lift devices coupled with the baffle permit selective adjustment of the vertical height of the bottom edge of the baffle with respect to the tank floor. This type of control can more readily provide for precise adjustment in the flow and consequent velocity of the cross-tank currents through the relatively simple expedient of merely varying a physical distance which is the spacing of the bottom of the baffle relative to the floor. Varying the size of the area through which the fluid may flow, since the flow rates of a fluid through an opening are proportional to the area of that opening, provides a very convenient and accurate means of control of the flow velocity. The mechanism required for effecting such control is extremelysimple and merely comprises a vertically displaceable wall which is easily moved in guideways along a predetermined path and can be supported at a selected vertical elevation.

A modification of the basic structure provides two distinct functional advantages. In the basic structure, the baffle is a unitary panel wherein the upper longitudinal edge is inherently concurrently adjusted as to its distance below the surface of the sewage in the tank as the bottom longitudinal edge is adjusted as to its spacing from the tank's bottom wall. As a consequence, the area of the space over the top of the baffle and through which the sewage must flow is changed in inverse relationship to the change in area of the space below the baffle with resulting complexities in flow velocities. Also, the basic structure has a baffle whic hincludes a bottom edge that is disposed in substantially parallel relationship to the tank's bottom wall resulting in a uniform or constant spacing throughout the length of the tank and an associated constant cross current velocity throughout the entire length of the tank for any selected vertical position of the baffle. In a modified structure, the baffle is constructed with two longitudinally extending, vertically superposed sections disposed in partially overlapped relationship with the one disposed at a relatively higher elevation than the other and supported in fixed relationship to the tank. The lower section is supported by a mechanism enabling selective vertical positioning to obtain adjustability in the spacing of its bottom edge relative to the tank's bottom wall. This composite baffle structure enables the desired control in velocity of circulating cross currents, but the upper edge of the baffle will remain at a constant elevation, thereby resulting in a substantially fixed area through which the sewage flows at the top of the baffle. Additionally, the bottom edge of the lowermost baffle section may be disposed in angled relationship to the tank's bottom wall and is convergent with respect thereto from its greatest spacing at the inlet end. This constructional feature results in the cross current velocity being the greatest at the inlet end of the tank where greater velocity is desired and decreases toward the outlet end, thereby better enabling settling of the smaller size grit in the region of the tank outlet.

These and other objects and advantages of this invention will be readily apparent from the following detailed description of the illustrative embodiments thereof and the accompanying drawings.

DESCRIPTION OF THE ILLUSTRATIVE EMBODIMENT

The illustrative aerated grit tank in which the basic embodiment of this invention is incorporated is of a conventional elongated rectangular shape in plan view with a substantially rectangular cross-section. A tank of this type is designated generally by the numeral 10 in the drawing figures and is open at the top having a bottom wall or floor 11 on which are supported upstanding, longitudinally extending side walls 12 and 13 and opposed end walls 14 and 15. An inlet 16 and an outlet 17 are provided to permit a flow of sewage into through and then subsequently, out of the tank 10. The inlet 16 and outlet 17 each comprise rectangularly shaped channels that are disposed at opposite ends of the tank and are located adjacent the upper part of thet ank. Each respective inlet and outlet is formed in the respective side walls 12 and 13 so as to direct sewage laterally into one end of the tank and permit its outflow laterally at the opposite end in general conformity with the helical flow path of the sewage that is generated within the tank. These inlets and outlets 16 and 17 are generally rectangularly shaped with their bottom edges formed to lie a predetermined distance below a nominal surface level of the sewage that is ordinarily expected to be contained in the tank. The surface of the sewage normally maintained in the tank is indicated by the line identified by the letter S. By appropriately sizing the outlet 17 so that its cross-sectional area will be of apredetermined size for a particular size tank, the flow of the sewage longitudinally through the tank can be effectively controlled. If desired, a weir plate 18 may be located adjacent the bottom of the outlet 17 and can be made adjustable to provide a secondary type of control for controlling the outflow of sewage from the tank, and thereby, effect a control over the longitudinal flow rate of the sewage through the tank.

In accordance with this invention, a vertically disposed wall 20 is supported in longitudinal extending relationship through the entire length of the tank. This wall 20 forms control means which is selectively adjustable to enable the velocity of the cross currents or the helical circulatory currents within the tank to be controlled within a very close tolerance. As can be seen in the drawing figures, the wall 20 is positioned more closely adjacent to the one wall 12 and is effective in dividing the interior of the tank 10 into two longitudinally extending and parallel chambers. These chambers, for convenience, are designated as a lift chamber 21 and a settling chamber 22.

Circulation of the sewage within the tank in a transverse direction is effected by means of an apparatus functioning as an airlift type pump. The airlift pump includes an air discharge header 24 extending longitudinally with respect to the tank and is disposed in close proximity to the bottom wall of the tank 11 and within the space designated as the lift chamber 21. An air supply system designated generally by the numeral 25 is provided and interconnected with the header 24.

Grit removal means is also provided for the aerated tank illustrated in the drawings. The grit removal means in accordance with this invention, preferably comprises a continuous conveyor 27 including a pair of parallel spaced chains 28 carrying a plurality of scraper flights 29 formed by C-shaped channels carried by the chains in longitudinally spaced relationship along the chains. This conveyor 27 is positioned to extend longitudinally with respect to the tank and is supported with the lower run supported in the form of a catenary on a bottom floor surface of predetermined configuration whereby the lower run is caused to move along the bottom floor of the tank in conformity to that surface and thence upwardly at one end of the tank to a discharge point. The upper run of the conveyor is supported on several sets of sprockets, one of which incorporates a drive mechanism.

Figure 4:
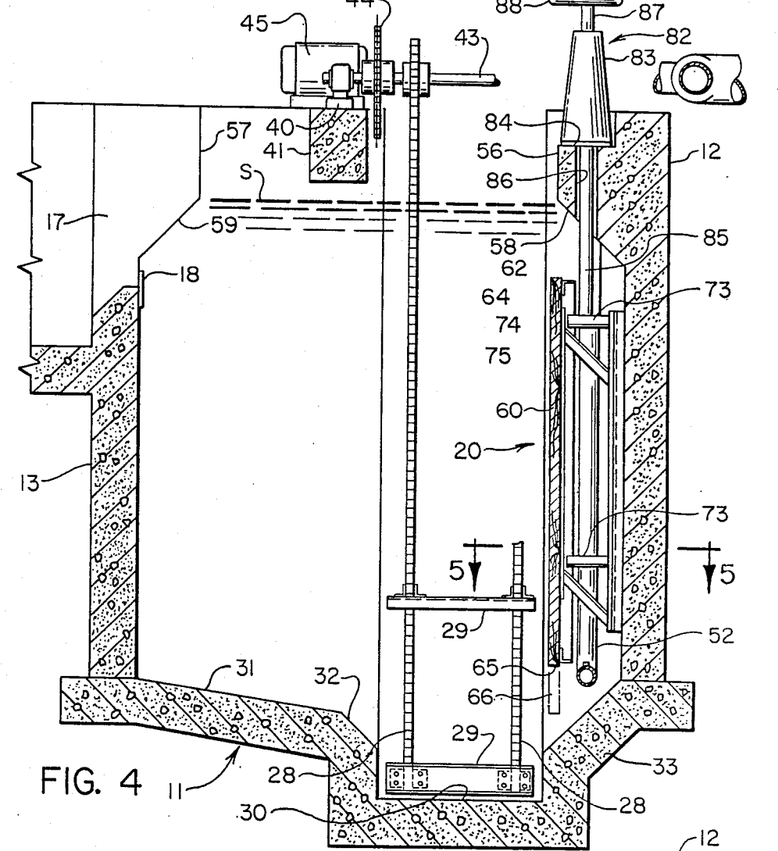
FIG. 4 is a transverse sectional view on an enlarged scale taken along line 4—4 of FIG. 1.
Figure 5:
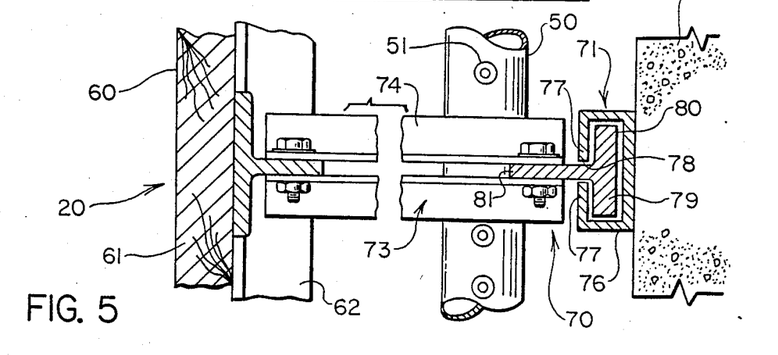
FIG. 5 is a fragmentary horizontal sectional view on an enlarged scale taken along line 5—5 of FIG. 4 and showing details of construction of the control wall support and guide.

Referring to FIG. 4, it will be seen that the bottom floor 11 of the tank is provided with a longitudinally extending channel 30 configured to receive a portion of the lower run of the grit removal conveyor 27 and which conveyor is pulled through the channel for collecting and removing grit that settles out of the sewage. At each side of the channel 30, the floor 11 slopes upwardly toward the respective side wall 12 or 13. In the section of the tank designated as the settling chamber, the floor surface 31 extends upwardly at an angle of the order of 10 degrees with respect to a horizontal plane. A marginal edge portion 32 of the settling chamber floor slopes at a substantially greater angle downwardly toward the channel. With respect to the lift chamber 21, the underlying bottom wall surface 33 slopes upwardly at a much steeper angle from the side of the channel 30 and is disposed at an angle of the order of 45 degrees with respect to a horizontal plane. This relatively greater angle of the lift chamber floor 33 assures that grit particles which may settle onto this portion of the tank floor will roll or flow downwardly by gravity and into the channel, even against the normally expected counterflowing currents.

Figure 1:
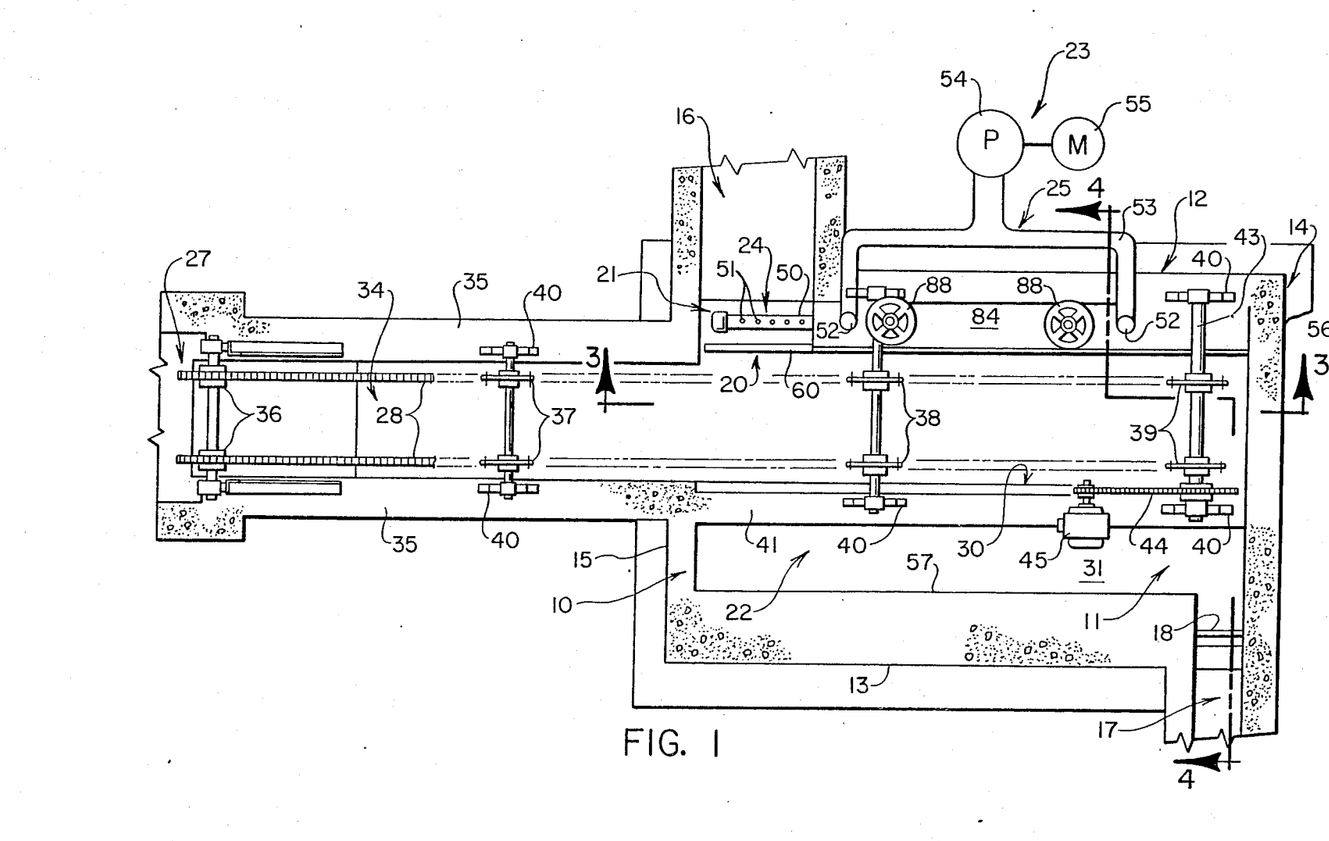
FIG. 1 is a top plan view of an aerated grit tank embodying this invention.
Figure 2:
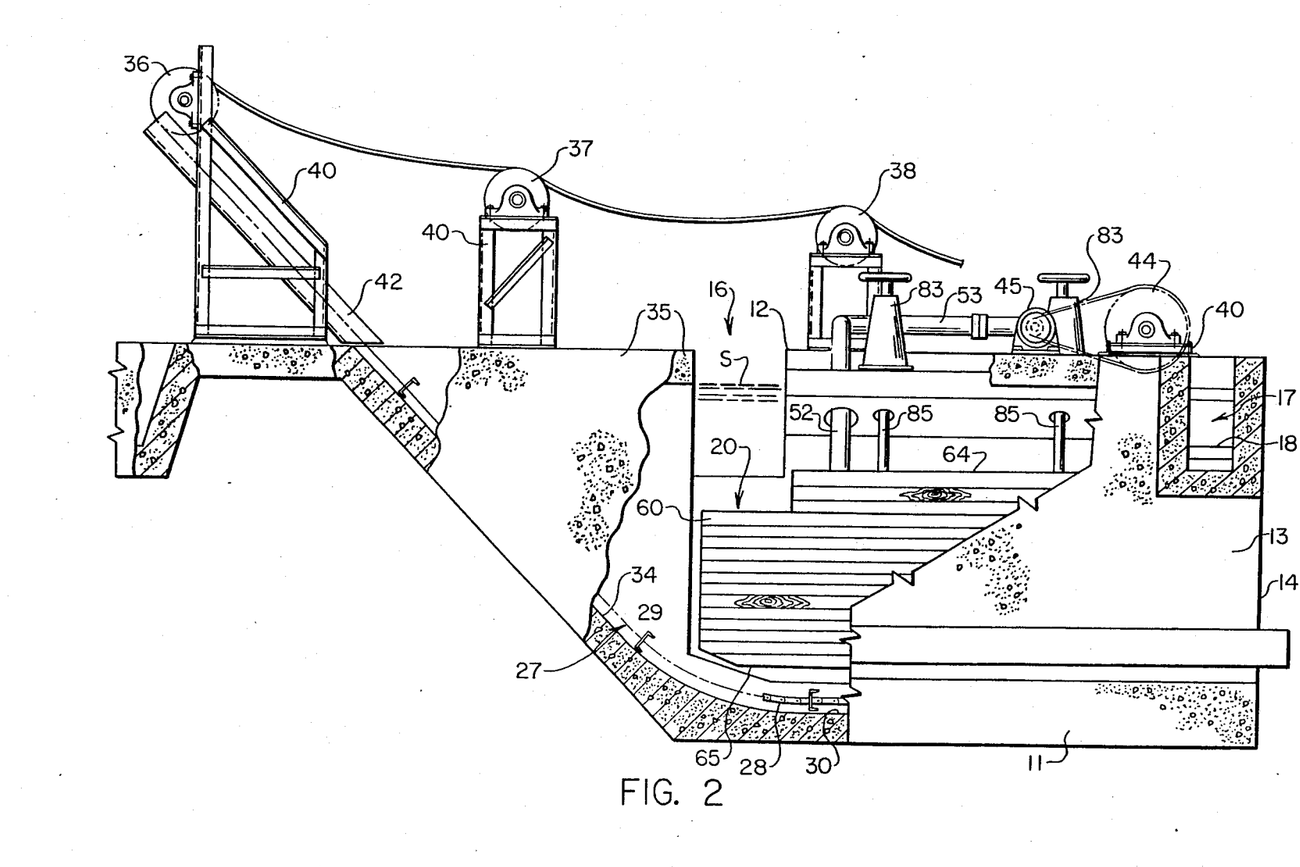
FIG. 2 is a side elevational view thereof with portions broken away for clarity of illustration.
Figure 3:
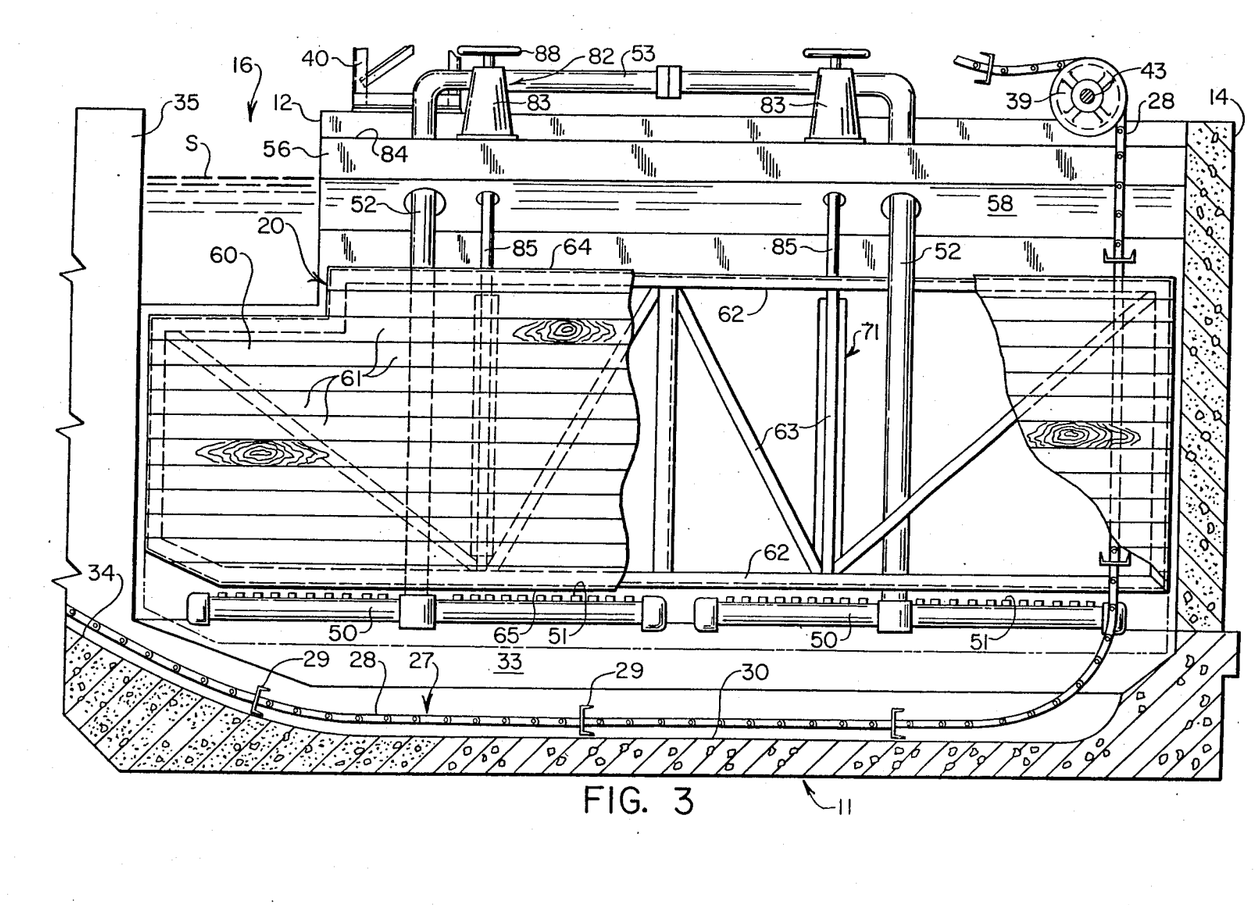
FIG. 3 is a fragmentary vertical sectional view on an enlarged scale taken along line 3—3 of FIG. 1.

The channel 30 in which the bottom run of the conveyor 27 travels includes a longitudinal extension 34 which extends outwardly with respect to the tank end wall 15 adjacent the inlet end of the tank. This channel extension, as can be best seen in FIGS. 2 and 3, is a continuation of an upwardly sloped portion of the channel and is defined by two spaced parallel side walls 35. The major portions of the channel 30 in the tank and the channel extension 34 have straight bottom surfaces, but have cooperatively curved, interconnecting end portions with a radius of curvature such that pulling of the conveyor will result in the lower run following along the bottom surfaces of the channel and its extension.

Support for the upper run of the conveyor 27 is provided by four sets of pairs of sprockets or pulleys designated generally by the numerals 36, 37, 38 and 39 and which engage with respective ones of the conveyor chains 28. These sprockets or pulleys are mounted on respective pedestals 40 and/or bearing mounts which are positioned in supported relationship on upper surfaces of the walls 35 of the channel extension or the side wall 12 and a support beam 41 extending longitudinally of the tank at a position where the channel 30 is between the beam and side wall 12. The one pair of sprockets 36 is positioned in longitudinally displaced relationship to the uppermost end of the channel extension 34 and at an elevation such that there will be a sufficient distance through which the scraper flights 29 travel to permit adequate draining of the water from the collected grit. This length is dependent upon the velocity at which the conveyor moves and the distance is related to the upper surface of the sewage S. The pedestal 40 supporting this pair of sprockets 36 also includes a channel-shaped trough or channel 42 which forms a further extension of the tank channel and enables the liquids to flow in a reverse direction into the tank. Grit that is carried upwardly by the scraper flights on this channel 42 is then discharged at its upper end into a collector where it is collected and retained for ultimate removal.

Driving of the conveyor 27 is effected by the one pair of sprockets 39 positioned at the outlet end of the tank 10. These sprockets 39 are mounted on an axle 43 which in turn is connected by a drive train 44 to a source of power such as an electric motor 45. Referring to the side elevational views and in particular to that of FIG. 2, it will be seen that the conveyor chains are supported primarily by the end pairs of sprockets 36 and 39 with the sprockets sets 37 and 38 disposed intermediate relative thereto to maintain the upper run in a generally horizontal plane. It will also be readily seen with respect to the vertical sectional views of FIGS. 2 and 3 that the conveyor chains will be supported in a manner such that the driving force applied through the upper run of the chains 28 will exert a force in opposition to the frictional drag forces of the scraper fligths 29 against the bottom surface of the channel 30 and channel extension 34 with due consideration to the weight of the grit that is collected and dragged along with the respective scraper flights such that the lower run will follow along and be supported upon the bottom surface of the channel and its upward extension. The portion of the conveyor chains that extend downwardly from the drive sprocket 39 will be oriented in a generally vertical plane with the scraper flights thus sequentially coming into supportive engagement with the bottom surface of the channel 30 adjacent the outlet end of the tank. If deemed necessary, the bottom floor of the tank and the channel adjacent the end outlet end of the tank may be appropriately configured to conform to the path of movement of the conveyor and thereby minimize the space or region where grit may collect, but not be susceptible of collection and removal. This providing of a conveyor suspended as a catenary results in having supporting and drive structures mounted only externally on the top of the tank and without having any mechanisms disposed within the adverse and relatively harsh environment of the sewage and grit within the tank itself. The bottom of the channel may be provided with a liner plate to enhance wearability and the scraper flights themselves may be provided with readily replaceable bottom wear plates.

In the illustrative embodiment, the airlift pump has the discharge header 24 thereof formed in two separate sections 50. Each header section 50 comprises an elongated tube provided with a plurality of air discharge orifice 51 disposed in axially spaced relationship along an upper side thereof. The size and spacing of the orifices 51 is dependent upon the physical size of the tank and the amount of air that must be discharged to effect the airlift pumping action. Centrally connected to each of the header sections 50 for the support thereof and forming a conduit for the supply of air thereto is a vertical distribution conduit 52 which extends upwardly and projects through an overhanging lip of the tank wall. The distribution conduits 52 are connected to a manifold 53 that, in turn, is connected to an air supply pump or blower 54 which is inlcuded in the air supplys ystem 25. Driving of the pump 54 may be effected by an electric motor 55.

Referring to FIG. 4, it will be seen that the upper end of each of the longitudinal side walls 12 and 13 is provided with a respective inwardly projecting lip 56 and 57. Each inwardly projecting lip 56 and 57 is formed with a respective inclined bottom surface 58 and 59. These inclined surfaces are generally positioned to be below the upper surface S of the sewage flowing through the tank. It will be noted with reference to FIG. 4 that these surfaces thus provide a flow directing effect with respect to the circulating fluid currents within the tank as the fluid is caused to move upwardly adjacent the wall 12 in the lift chamber 21. As the current approaches the upper end, it will be deflected by the surface 58 which thus aids in causing the currents to flow transversely across the tank. Similarly, as the transversely directed currents reach or approach the opposite longitudinal side wall 13, they will tend to be deflected by the surface 59 in a downward direction adjacent that wall. It will also be noted with respect to the several drawing figures that the inwardly projecting lip 56 carried at the upper end of the wall 12 also functions as a mounting surface and support for various components of the apparatus such as pedestals for the conveyor, the distribution conduits 52 and for associated supporting and control components of the control wall or baffle 20 as will be further described.

In this illustrative embodiment of the invention, the control wall or baffle 20 is formed as a single unit although it will be understood that the wall may be formed in a multiplicity of longitudinally aligned sections depending upon the size and weight factors for a particular size of tank. For the purposes of this invention disclosure, it will be sufficient to consider a unitary type of structure which extends throughout the length of the tank. The function and operation of the wall will be the same regardless of whether it is a single unitary structure or is divided into a plurality of longitudinally segregated sections.

As previously noted, the control wall 20 is designed to be selectively adjusted in a vertical plane to a desired position to provide a means of varying or selectively adjusting the area of the space under the wall and through which the fluids in the tank will flow from the settling chamber 22 into the lift chamber 21 and thereby enable control of the velocity of the currents and particularly those portions of the currents flowing over and adjacent to the bottom wall 11. The control wall is disposed in spaced relationship to the side wall 12 to be essentially located in parallel relationship along the side of the channel next adjacent the side wall 12 whereby the channel is located entirely within the region designated as the settling chamber 22. Forming the wall is a panel 60 which may be advantageously constructed from a plurality of longitudinally extending boards 61 which are secured to a structural frame 62. This structural frame 62 may be formed from L-shaped structural steel member which, as can be best seen in FIG. 3, are fabricated into a peripheral frame and having a plurality of vertically and angularly extending reinforcing or rigidifying elements 63 disposed in longitudinally spaced relationship. The wall 20 is thus seen to have a generally rectangular shape and of a length to extend substantially the entire length of the interior of the tank. It has a vertical height to provide a substantial separation as between the lift and settling chambers 21 and 22 and has an upper longitudinally extending edge 64 and a bottom longitudinally extending edge 65. In FIG. 3, the wall 20 is shown disposed in its uppermost position whereas it is shown in FIG. 2 in its lowermost position. Supporting the wall are mechanisms which enable its displacement in a vertical plane to a position where the bottom longitudinal edge 65 will be located as indicated in FIG. 3 by the broken line 66, or to any position therebetween. Thus, it will be seen that the space between the bottom longitudinal edge 65 of the wall and the underlying lift chamber floor 33 can be adjusted to alter the area of the space through which the fluids may flow under the wall into and then upwardly through the lift chamber. Referring to FIG. 3, it will also be noted that the upper marginal edge portion of the control wall in the region of the inlet 16 is formed with a notch or recess to avoid interference as to the inflow of sewage into the tank when the panel is in its uppermost position.

Support of the panel 60 for its vertical displacement in spaced parallel relationship to the wall 12 is provided by a carrier frame 70 operating in guide means 71. In the illustrative embodiment, the carrier frame and guide means are formed in two identically constructed units that are disposed in longitudinally spaced relationship. Each carrier frame 70 includes an elongated T-shaped rail 72 having a pair of vertically spaced apart connector brackets 73. The T-shaped rails 72 are secured to the respective boards 61 comprising the panel 60 and are also advantageously interconnected with the structural frame 62. Each of thec onnector brackets 73 includes a horizontally extending strut 74 and a downwardly inclined brace 75. The ends of the connector bracket 73 remote to the T-shaped rail 72 are connected to cooperating guide means 71 secured to and carried by the longitudinal wall 12 of the tank. In this illustrative embodiment, the guide means 71 may conveniently comprise a vertically disposed C-shaped channel 76 having opposed inturned flanges 77 defining a vertically extending slot 78. Slideably disposed in the channel 76 is a T-shaped rail 79 with the head 80 thereof disposed within the interior of the channel and the leg portion 81 projecting outwardly through the slot 78. The leg 81 is mechanically interconnected and secured to the connector brackets 73.

Support and positioning of the wall 20 at a selected vertical elevation is provided by respective support structures 82 for each of the two sections of the carrier frame. Each of the support structures 82, and which structures are of identical construction, include an operating stand 83 which is mounted on an upper ledge 84 of the inwardly projecting lip 56 formed at the top of the wall 12. A support shaft 85 connected at its one end of the uppermost connector bracket 73 extends upwardly therefrom and through a passageway 86 formed in the lip and continues axially upward and into the operating stadn 83. The upper end of the shaft 85 is connected to a screw-threaded shaft 87 that projects a distance upwardly from the operating stand and is provided with an operating hand wheel 88 at its uppermost end. Rotation of the screwthreaded shaft 87 will thus be effective in effecting axial displacement of the respective support shaft 85 and consequent vertical displacement of the wall to a desired position. Two separate and independently operated stands 83 are provided in the illustrative embodiment. These mechanisms are designed to be operated substantially simultaneously, but can be manipulated by one person through alternative operation of each for a small distance. If desired, the mechanisms may be mechanically interconnected for concurrent operation from a single opeating point. Also, it will be understood that in the case of a control wall 20 formed in a plurality of longitudinally aligned sections, additional support structures would be provided as required to provide the necessary support and ability to conveniently displace the control wall to a desired elevation.

Functional operation of an aerated grit tank 10 as disclosed in the drawings and described herein can be best understood by reference to FIG. 4. For purposes of describing functional operation, it is assumed that the sewage tank is filled with sewage having an upper level at the line S with the sewage flowing generally longitudinally through the tank from the inlet 16 and out thorugh the outlet 17. It is also assumed that the panel 60 of the control wall 20 is positioned at a selected vertical elevation such that its bottom longitudinal edge 65 is spaced a predetermined distance above the bottom wall surface 33 underlying the lift chamber 21. Also, it is assumed that the air supply system 25 is operating with air being discharged through the orifices 51 of the header sections 50 in sufficient quanitity to result in an upward flow of sewage in the lift chamber 21. With the panel 60 thus positioned there will be a rectangular space of a predetermined area through which the sewage may flow from the settling chamber 22 and into the lift chamber at the bottom region thereof. For a static operating condition of a specified quantity of air being discharged from the headers, there will be a proportionately related flow of sewage through this space underlying the bottom edge 65 of the panel 60 and that flow will thus have a particular velocity. This, in effect, also controls the velocity of the sewage circulating transversely with respect to the tank and particularly relative to the bottom surface 31 of the settling chamber. The objective in an appratus of this type is to achieve a velocity of the cross currents in the region of and over the surface 31 of the tank bottom such that grit is enabled to settle onto this surface and will then be transported by the cross current transversely of the tank into the channel 30. This operation of the cross currents moves the grit that has settled and as a consequence of this movement, causes sufficient disturbance to enable organic particles that may also settle to be more fully separated therefrom in a scouring type of operation whereby those organic particles will again be entrained into the sewage for continued circulation and ultimate discharge or outflow from the tank at the outlet 17.

As previously noted, the sewage that is received varies during the course of a day or other time period as to the grit that is included in the sewage as to both quantity and as to its particle size. Thus, it is advantageous to be able to control the cross current velocity of the sewage adjacent and over the surface 31 as well as throughout the tank in order to achieve optimum settling of grit having particle sizes above that which is acceptable for continued processing in the sewage treatment plant and to better assure that grit that does settle onto the bottom wall of the tank will be carried into the channel 30 for subsequent collection and removal from the tank. This control is obtainable with the illustrative apparatus through the expedient of selected vertical positioning of the panel 60 and thus affecting a change in the spacing of the bottom longitudinal edge 65 relative to the lift chamber floor 33 and the area through which the sewage flows transversely of the tank. Decreasing the relative spacing between the edge 65 of the panel 60 and the floor 33 results in a decrease in the area and a consequent decrease in the velocity of the cross currents. Thus, the apparatus may be selectively adjusted to accommodate sewage having grit that is of smaller sizes and a lesser quantity so as to enable the grit to settle, but not cause the grit to again become entrained in the sewage for continued circulation and greater likelihood of flowing out of the grit tank. Conversely, increasing the spacing of the bottom edge 65 of the panel realtive to the bottom wall surface 33 results in an increase in the velocity of the cross currents. Thus, an increase in the spacing will accommodate the grit tank to a sewage condition having relatively larger grit particles and a greater quantity while maintaining the assured separatio of grit and organic particles that may settle onto the floor 31 of the settling chamber 22.

Figure 6:
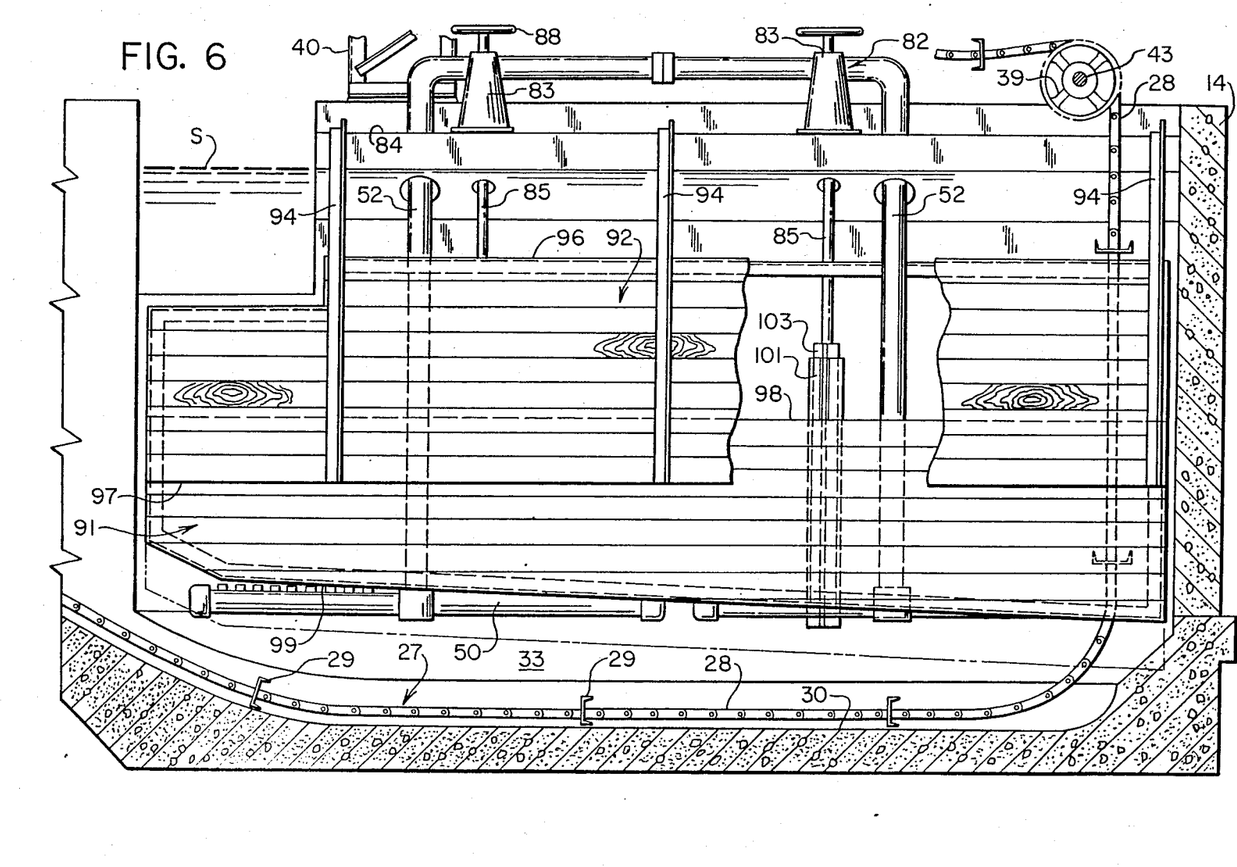
FIG. 6 is a fragmentary vertical sectional view similar to FIG. 3, but showing an aerated grit tank provided with a modified control wall.
Figure 7:
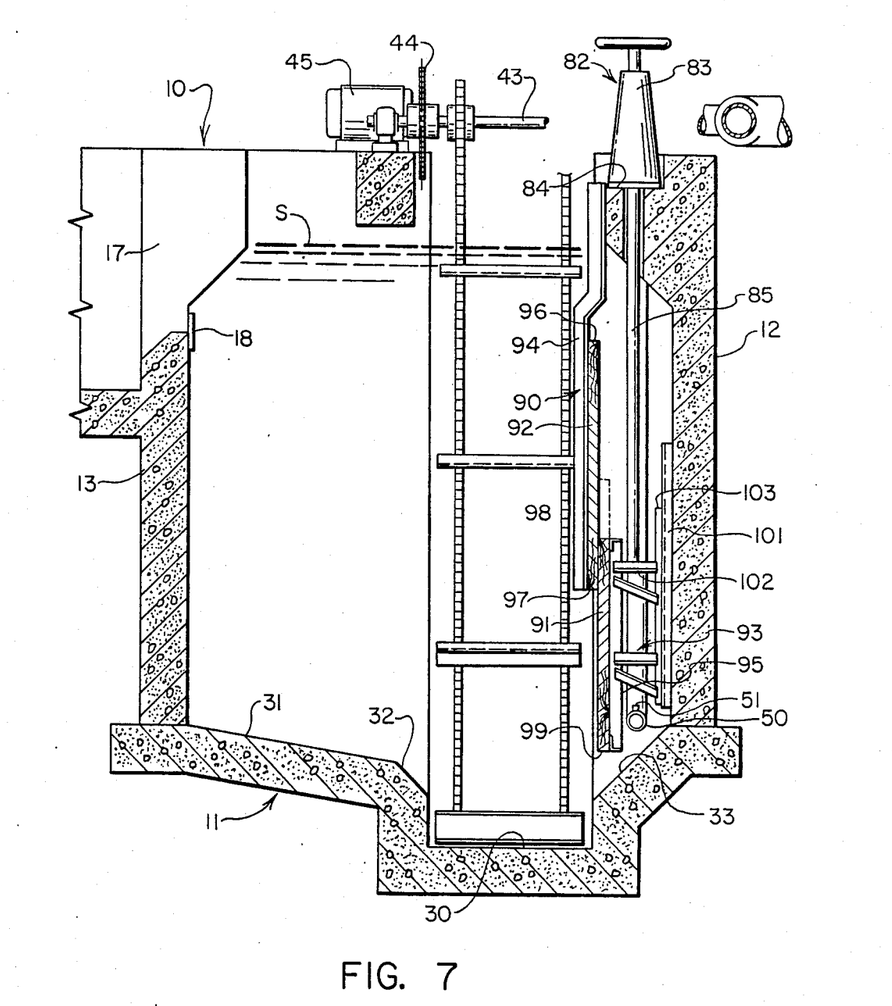
FIG. 7 is a transverse sectional view similar to FIG. 4, but of the modified tank and control wall of FIG. 6.

An aerated grit tank 10 embodying this invention and functionally operative in the manner of the first described embodiment, but having a control wall 90 of modified construction is shown in FIGS. 6 and 7. In this illustrative modified embodiment, structural components which are the same as those described in conjunction with the embodiment shown in FIGS. 1-5 are designated by the same numerals. The control wall 90 in this modification retains the function of controlling the velocity of cross currents within the tank. However, this wall also provides for a variation in the cross current velocity with respect to the longitudinal position in the tank of those cross current components and eliminates variations in the depth of the sewage above the upper longitudinal edge of the panel.

Referring to FIGS. 6 and 7, it will be seen that the control wall 90 includes two longitudinal extending panels 91 and 92 which are supported by respecting pairs of carrier frames 93 and a set of support brackets 94. Each of the two panels 91 and 92 which extend substantially the full length of the tank 10 are formed from a plurality of boards with those of the lower panel 91 being secured to a structural frame 95. The upper panel 92 has its plurality of longitudinally extending boards secured to each of the three support brackets 94. Those support brackets 94 may comprise structural members of L-shaped cross-section and have a lower end portion secured to the several boards with the upper end portions projecting upwardly for securing to the wall 12 at its upper ledge 84. These brackets 94 thus support the upper panel 92 in a fixed position lying in a vertical plane disposed in spaced parallel relationship to the side wall 12 located substantially vertically above the one channel side wall. The upper panel 92 has a horizontally extending upper edge 96 which is thus disposed a fixed distance below the surface S of the sewage contained within the tank. With this fixed positioning of the upper panel 92, there will be a constant area or space through which the sewage flowing upwardly in the lift chamber 21 may flow outwardly and transversely over the top region of the tank. The upper panel 92 has a sufficient vertical height to provide an adequate overlap for the lower panel 91 and terminates in a lower horizontal edge 97.

The lower panel 91 is mounted on the carrier frame 93 for vertical displacement within the tank in much the same manner as that described with the first illustrative embodiment. This lower panel 91 has an upper horizontally extending edge 98 and a bottom longitudinally extending edge 99 and is of a vertical height sufficient to have an upper marginal edge portion in overlapped relationship to the upper panel 92 throughout its entire extent of movement. Preferably, the upper panel 92 is of a vertical extent to form a substantially greater portion of the wall with the consequent advantage that the lower panel 91 will be of minimum size and weight for ease of operation. The carrier frame 93 includes guide means 100 having a guide channel 101 secured to the inner surface of the wall 12. A plurality of connector brackets 102 secured to the structural frame 95 have a T-shaped guide rail 103 which is slideably disposed in the guide channel 101. A pair of support structures 82 each having respective support shafts 85 are provided to carry and enable vertical displacement of the lower panel 91. These support structures, as described with respect to the first embodiment each include an operating stand 83 mounted on the upper ledge 84 with the support shaft 85 extending downwardly and interconnected with a respective support bracket 94.

The lower panel 91 is thus capable of limited vertical displacement such that its lower edge 99 may be positioned at a selected elevation with respect to the bottom wall surface 33 underlying the lift chamber 21 to permit changes in the space through which the sewage flows and thereby control cross current velocity. As noted, the lower panel 91 has a vertical extent such that its upper marginal edge portion will overlap the upper panel 92. Forming the support brackets 94 of appropriate dimension will locate the surface of the panel 91 facing inwardly of the tank so that the upper marginal edge portion that overlaps the upper panel is disposed in closely disposed parallel relationship to an opposed surface of the upper panel. With this construction, it will be seen that a control wall 90, while having the desired capability of adjusting the relative vertical position of the lower edge 99 relative to the bottom of the tank, will have an upper edge which does not vary with respect to the surface S of the sewage in the tank.

Referring specifically to FIG. 6, it will be seen that the lower panel 91 is constructed with its lower longitudinally extending edge 99 disposed at an angle with respect to a horizontal plane. A consequence of this inclined position of the lower edge of the bottom panel is that there will be a continuing difference in the relative spacing of that edge with respect to the bottom wall surface 33. The functional effect of this variation in spacing that there is a relatively larger spacing at the end of the tank associated with the inlet of the sewage as compared to the end portion adjacent the outlet end. Consequently, cross current velocities will vary throughout the length of the tank with the greater velocity occurring at the inlet end and the lower velocities occurring at the outlet end. The advantage of this construction is that the desired relatively higher velocities are obtained at the inlet end as contrasted to the outlet end of the tank since the greater amount and larger size grit will settle during the initial portion of longitudinal travel through the tank. Accordingly, with this construction, it is possible to achieve a variation in the cross current velocities which will vary in accordance with the grit particle size as the grit settles throughout the length of the tank. Vertical adjustment of the lower panel 91 maintains this difference in an area through which the cross currents flow and maintains the desired difference in cross current velocity longitudinally along the tank.

It will be readily apparent from the foregoing detailed description of illustrative embodiments of this invention that an improved aerated grit tank is provided having a particularly novel means for effectively and selectively controlling cross current velocity of the sewage within the tank. Providing current velocity control means in the form of a vertically adjustable control wall enables control of the cross current flow velocity in the region of the tank floor on which the grit settles to effect a scouring action to better eliminte organic sewage particles that may also settle with the grit and maintain such organic material entrained in the sewage for subsequent processing. Additionally, the control of cross current flow velocity enables these currents to cause settled grit to move transversely of the tank to a channel where it is collected for removal from the tank. Providing of a control wall in two sections with an upper section supported in fixed relationship to the tank results in a constant size area above the top of the wall regardless of the vertical positioning of the lower section for better control. Forming the bottom of the control wall with a longitudinal edge that is disposed in angled relationship to the tank bottom provides a continually varying cross current flow velocity along the length of the tank to further improve separation of grit.

Having thus described this inention, what is claimed is:

1. An aerated grit tank for separating grit from sewage comprising
   an elongated tank having an inlet at one end and an outlet at the opposite end whereby sewage may be caused to flow longitudinally through said tank with a predetermined fluid level in said tank, said tank having a bottom wall for receiving grit that settles out of the sewage and spaced apart longitudinally extending side walls,
   grit removal means disposed in cooperating relationship to said tank bottom wall and operable to collect grit that has settled on the floor and to transport such collected grit out of said trunk,
   cross current flow inducing means disposed in said tank for causing the sewage to circulate in a transverse direction to its longitudinal flow resulting in a generally helical flow path, said flow inducing means including an air distributor disposed adjacent to said tank bottom wall and a first one of said side walls for discharge of air into the sewage along a line extending longitudinally of said tank to thereby produce an upward flow of sewage adjacent said first side wall, and
   cross current velocity control means including an upstanding control wall disposed in predetermined spaced relationship to said first side wall whereby air discharged from said distributor will flow upwardly between said control wall and said first side wall, said control wall extending longitudinally from the inlet of said tank to the outlet thereof and having longitudinally extending bottom and top edges and supported in said tank whereby said top edge is disposed a distance below the surface of the sewage in the tank enabling sewage to flow transversely over the top of said control wall and said bottom edge is disposed in spaced relationship to said tank bottom wall defining in cooperation therewith a flow space having an area of predetermined size through which sewage may flow transversely of said tank, said control means including carrier means on which said control wall is supported enabling displacement of said control wall in a generally vertically disposed plane, said carrier means including a carrier frame attached to said control wall and guide means having an elongated guide mounted on said tank with said carrier frame and guide means cooperatively interengaged for guiding of said control wall along a predetermined path and support means mounted on said tank and operatively coupled with said control wall to support said control wall with the bottom edge thereof in predetermined spaced relationship to said tank bottom wall, said support means being selectively operable to vertically displace the control wall bottom edge with respect to the tank bottom wall and thereby effect a change in the area of said flow space whereby the velocity of transverse sewage flow in at lest a region adjacent said tank bottom wall may be effectively controlled.

2. An aerated grit tank according to claim 1 wherein said guide means is mounted on said first side wall and said carrier frame supports said control wall in spaced relationship to said first side wall.

3. An aerated grit tank according to claim 2 wherein said carrier means includes at least two carrier frames and guide means disposed in longitudinally spaced relationship.

4. An aerated grit tank according to claim 1 wherein the bottom edge of said control walle xtends in spaced parallel relationship to the bottom wall of said tank.

5. An aerated grit tank according to claim 1 wherein said inlet is formed in said first side wall whereby sewage flows into said tank in a transverse direction to the longitudinal flow of sewage through said tank.

6. An aerated grit tank according to claim 5 wherein said outlet is formed in said tank whereby sewage flows in a generally transverse direction to said tank when exiting said tank.

7. An aerated grit tank according to claim 5 wherein said inlet is formed in the upper portion of said first side wall whereby sewage is enabled to flow into said tank in a region that is above the top edge of said control wall.

8. An aerated grit tank according to claim 1 wherein said control wall includes two longitudinally extending panels disposed in substantially parallel relationship with the one panel supported in relatively elevated relationship to the other, the lowermost of said two panels being coupled with said support means and having said longitudinally extending bottome dge vertically displaceable with respect to said tank bottom wall.

9. An aerated grit tank according to claim 8 wherein the uppermost of said control wall panels is supported in fixed relationship to said tank and having said longitudinally extending top edge.

10. An aerated grit tank according to claim 8 wherein said two panels are of respective vertical extent to have adjacent marginal edge portions disposed in overlapped relationship throughout the entire extent of relative displacement of said lowermost panel.

11. An aerated grit tank according to claim 8 wherein the bottom edge of said lowermost panel extends in spaced parallel relationship to the bottom wall of said tank.

12. An aerated grit tank according to claim 8 wherein said lowermost panel is supported on carrier means enabling displacement thereof in a generallyv ertical palne, said support means mounted on said tank and coupled with said carrier means for suspending said lowermost panel in said tank.

13. An aerated grit tank according to claim 1 wherein said grit removal means includes an endless conveyor having a plurality of scraper flights disposed in relatively spaced relationship around the conveyor, support means mounted on said tank for supporting said conveyor for revolution in a vertical plane and suspending at least a portion of a lower run thereof in said tank to be supported solely on the bottom wall of said tank for collecting grit settled thereon and transporting such collected grit upwradly out of said tank for discharge.

14. An aerated grit tank according to claim 13 wherein the plane of said conveyor is disposed in substantially parallel relationship to said control wall and said bottom wall is formed with a channel extending longitudinally of said tank for receiving at least a portion of the bottom run of said conveyor for movement therealong, said channel having an upwardly projecting extension that extends from the inlet end of said tank in longitudinally outward relationship thereto and up which the conveyor transports collected grit, the channel formed in the bottom wall of said tank and its upwardly projecting extension interconnected by an arcuately curved portion whereby pulling of the lower run of said conveyor will maintain said lower run in supported relationship in said channel.

15. An aerated grit tank according to claim 1 wherein said tank bottom wall is sloped downwardly from a second side wall in a transverse direction whereby cross currents cause settled grit to move transversely across said tank toward said first side wall.

16. An aerated grit tank for separating grit from sewage comprising an elongated tank having an inlet at one end and an outlet at the opposite end whereby sewage may be caused to flow longitudinally through said tank with a predetermined fluid level in said tank, said tank having a bottom wall for receiving grit that settles out of the sewage and spaced apart longitudinally extending side walls, grit removal means disposed in cooperating relationship to said tank bottom wall and operable to collect grit that has settled on the floor and to transport such collected grit out of said tank, cross current flow inducing means disposed in said tank for causing the sewage to circulate in a transverse direction to its longitudinal flow resulting in a generally helical flow path, said flow inducing means including an air distributor disposed adjacent to said tank bottom wall and a first one of said side walls for discharge of air into the sewage along a line extending longitudinally of said tank to thereby produce an upward flow of sewage adjacent said first side wall, and cross current velocity control means including an upstanding control wall disposed in predetermined spaced relationship to said first side wall whereby air discharged from said distributor will flow upwardly between said control wall and said first side wall, saidcontrol wall extending longitudinally from the inlet of said tank to the outlet thereof and having longitudinally extending bottom and top edges and supported in said tank whereby said top edge is disposed a distance below the surface of the sewage in the tank enabling sewage to flow transversely over the top of said control wall and said bottom edge is disposed in spaced relationship to said tank bottom wall defining in cooperation therewith a flow space having an area of predetermined size through which sewage may flow transversely of said tank, said control wall including two longitudinally extending panels disposed in substantially parallel relationship with the one panel supported in relatively elevated relationship to the other and the lowermost panel having said longitudinally extending bottom edge, said bottom edge extending in angled relationship to the bottom wall of said tank and converging with respect thereto from the inlet end of said tank to the outlet end thereof, said control means including support means operatively coupled with the lowermost of said two panels of said control wall to support said lowermost panel with the bottom edge thereof in predetermined spaced relationship to said tank bottom wall, said support means being selectively operable to vertically displace the control wall bottom edge with respect to the tank bottom wall and thereby effect a change in the area of said flow space whereby the velocity of transverse sewage flow in at least a region adjacent said tank bottom wall may be effectively controlled.

17. An aerated grit tank for separating grit from sewage comprising an elongated tank having an inlet at one end and an outlet at the opposite end whereby sewage may be caused to flow longitudinally through said tank with a predetermined fluid level in said tank, said tank having a bottom wall for receiving grit that settles out of the sewage and spaced apart longitudinally extending side walls, grit removal means disposed in cooperating relationship to said tank bottom wall and operable to collect grit that has settled on the floor and to transport such collected grit out of said tank, cross current flow inducing means disposed in said tank for causing the sewage to circulate in a transverse direction to its longitudinal flow resulting in a generally helical flow path, said flow inducing means including an air distributor adjacent to said tank bottom wall and a first one of said side walls fo discharge of air into the sewage along a line extending longitudinally of said tank to thereby produce an upward flow of sewage adjacent said first side wall, and cross current velocity control means including an upstanding control wall disposed in predetermined spaced relationship to said first side wall whereby air discharged from said distributor will flow upwardly between said control wall and said first side wall, said control wall extending longitudinally from the inlet of said tank to the outlet thereof and having longitudinally extending bottom and top edges and supported in said tank whereby said top edge is disposed a distance below the surface of the sewage in the tank enabling sewage to flow transversely over the top of said control wall and said bottom edge is disposed in spaced relationship to said tank bottom wall defining in cooperation therewith a flow space having an area of predetermined size through which sewage may flow transversely of said tank, said bottom edge of said control wall extending in angled relationship to the bottom wall of said tank and converging with respect thereto from the inlet end of said tank to the outlet end thereof, said control means including support means operatively coupled with said control wall to support said control wall with the bottom edge thereof in predetermined spaced relationship to said tank bottom wall, said support means being selectively operable to vertically displace the control wall bottom edge with respect to the tank bottom wall and thereby effect a change in the area of said flow space whereby the velocity of transverse sewage flow in at least a region adjacent said tank bottom wall may be effectively controlled.

* * * * *